United States Patent [19]

Goodrich, Jr. et al.

[11] Patent Number: 4,511,153
[45] Date of Patent: Apr. 16, 1985

[54] CHUCKING ACCESSORY

[76] Inventors: Lloyd E. Goodrich, Jr., 559 S. Aldenville, Covina, Calif. 91723; Robert A. Long, 1613 W. Sherway Dr., West Covina, Calif. 92404

[21] Appl. No.: 404,451
[22] Filed: Aug. 2, 1982
[51] Int. Cl.³ .............................................. B23B 31/40
[52] U.S. Cl. .................................................. 279/2 R
[58] Field of Search .................. 279/1 A, 2 R, 1 DC, 279/1 DA; 82/43, 44; 242/72.1

[56] References Cited

U.S. PATENT DOCUMENTS

| | | | |
|---|---|---|---|
| 1,467,821 | 9/1923 | Tuttle | 82/44 |
| 2,383,036 | 8/1945 | Benjamin et al. | 82/44 |
| 2,469,873 | 5/1949 | Ernest | 279/2 R |
| 2,970,842 | 2/1961 | Drew | 279/2 R |
| 3,115,798 | 12/1963 | Donaway | 279/2 R |
| 3,131,946 | 5/1964 | Newhouser | 279/2 R |
| 3,311,383 | 3/1967 | Cox | 279/2 R |
| 4,208,061 | 6/1980 | Morawski | 279/2 R |

*Primary Examiner*—William R. Briggs
*Attorney, Agent, or Firm*—Beehler, Pavitt, Siegemund, Jagger & Martella

[57] ABSTRACT

A chuck accessory for grasping a tubular workpiece at the interior wall by action originating in the jaws of a conventional three-jaw chuck makes use of an internal split jaw mandrel, the jaw elements of which are forced into outwardly directed engagement with the interior wall of the workpiece. To transfer conventional chuck action to the interior split jaw mandrel use is made of a transfer assembly in which a set of circumferentially disposed tilting fingers in the form of bell crank levers mounted on an accessory body have extensions which project endwardly against one end of an axially movable draw sleeve. There is an expansion plug at the opposite end of the draw sleeve which, when drawn into the expanding portion of the split jaw mandrel, expands the jaw elements into engagement with the workpiece. A spring return disengages the mandrel.

16 Claims, 13 Drawing Figures

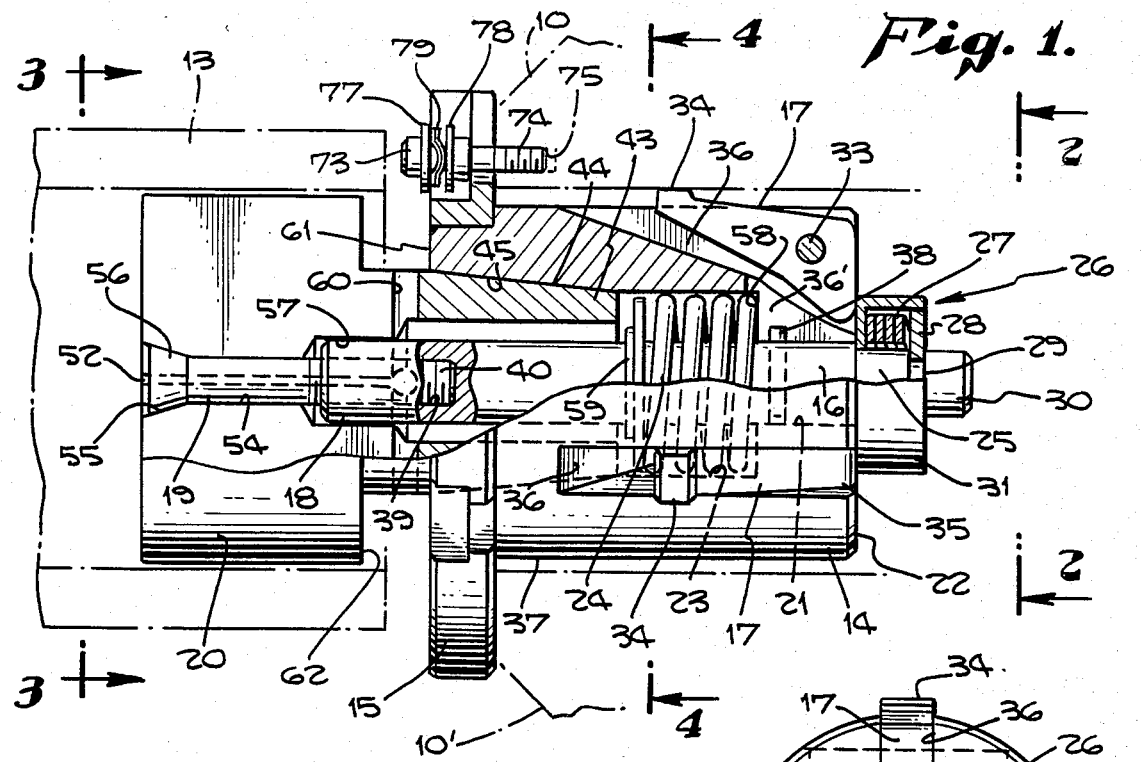
Fig. 1.
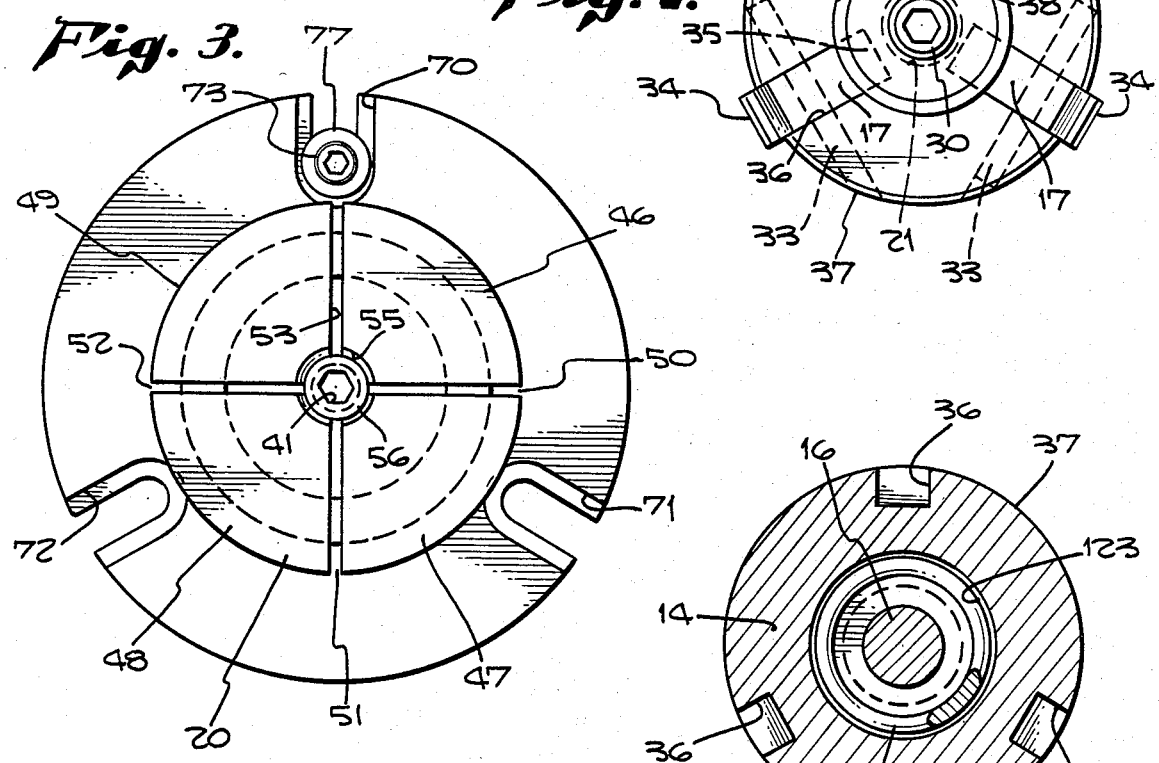
Fig. 2.
Fig. 3.
Fig. 4.

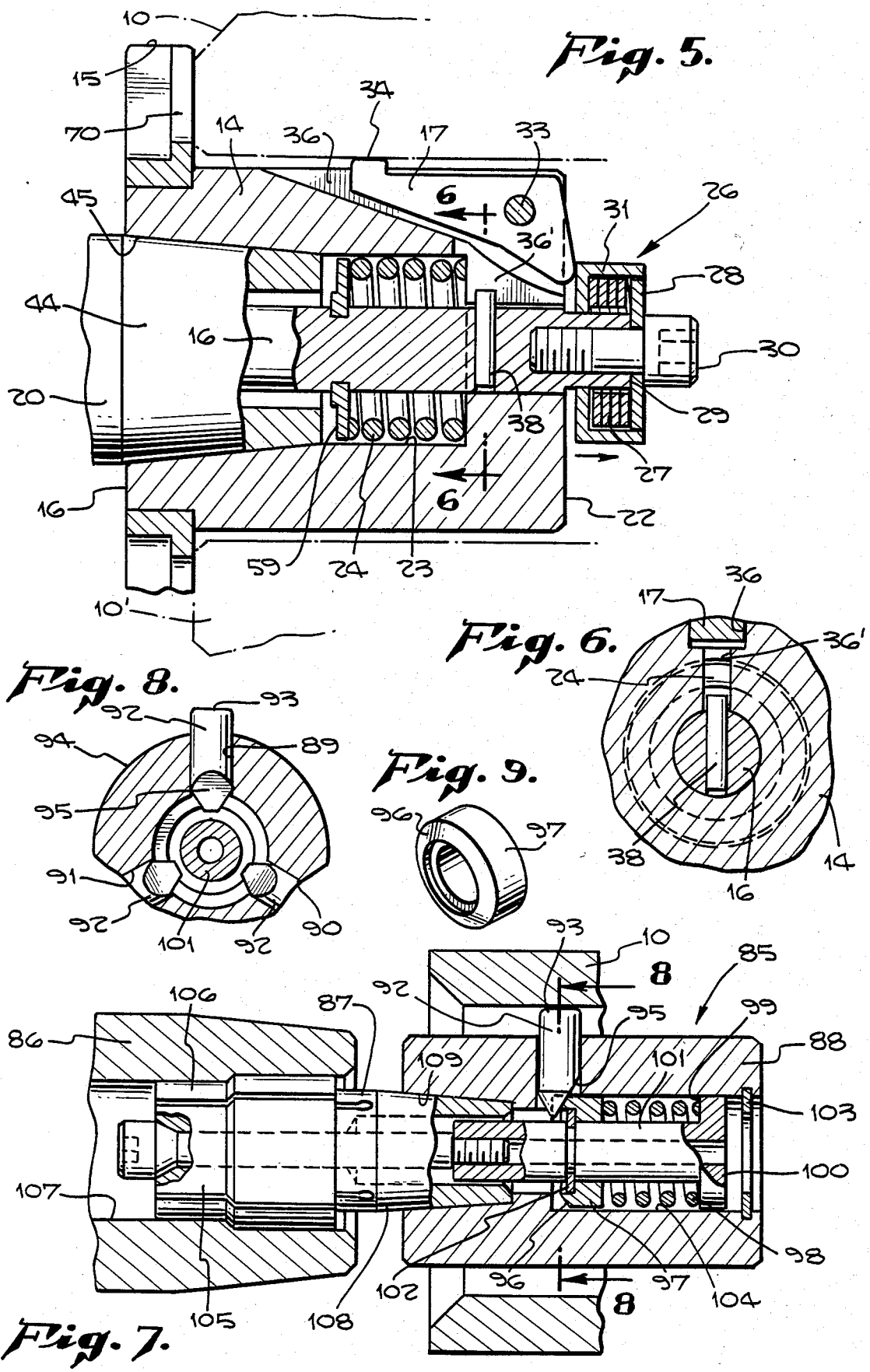

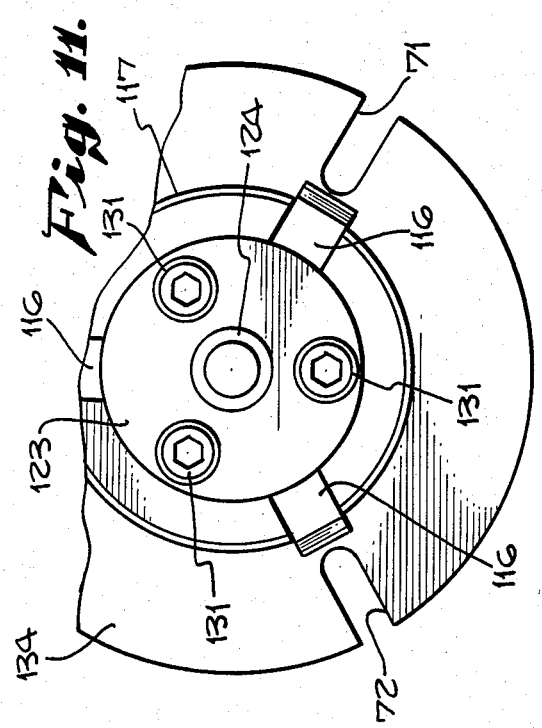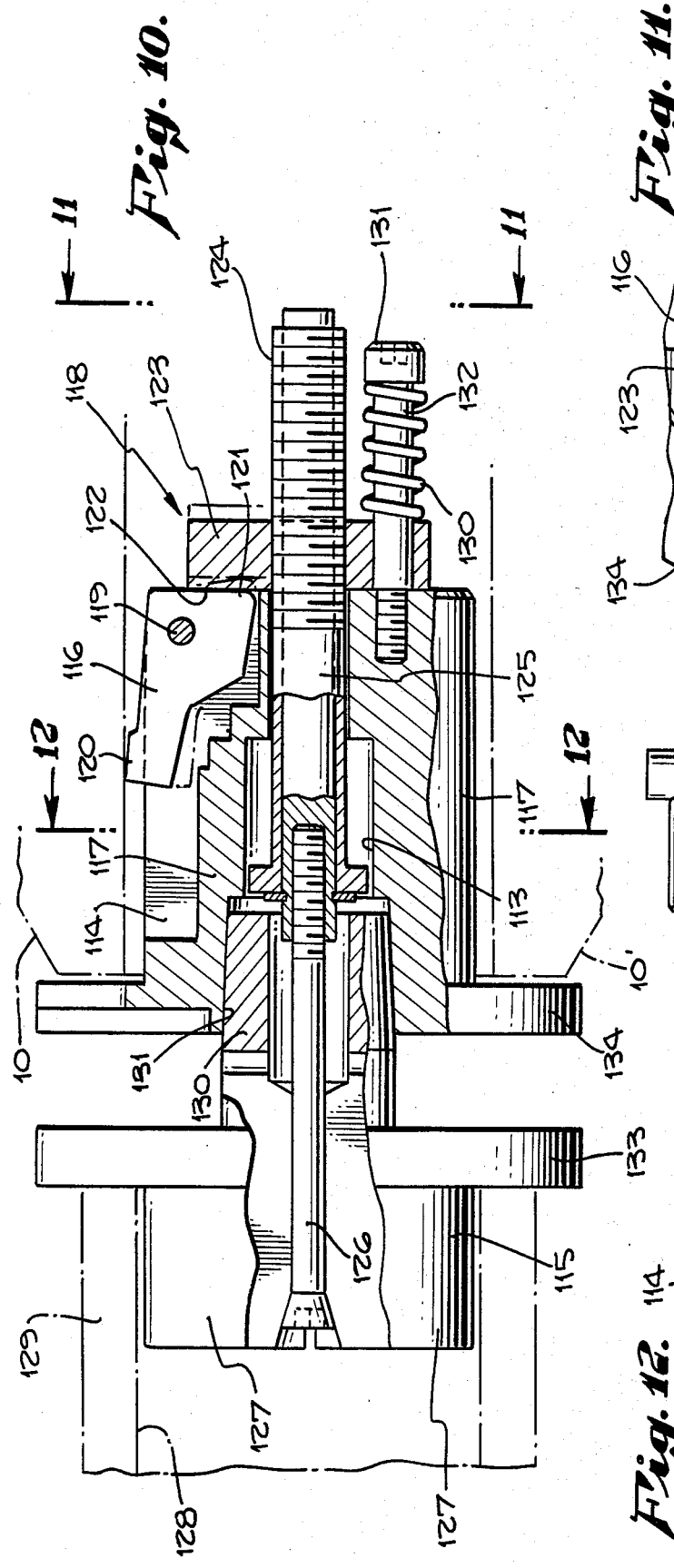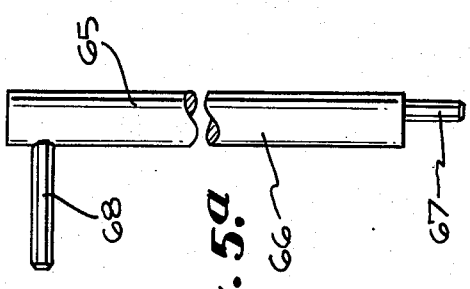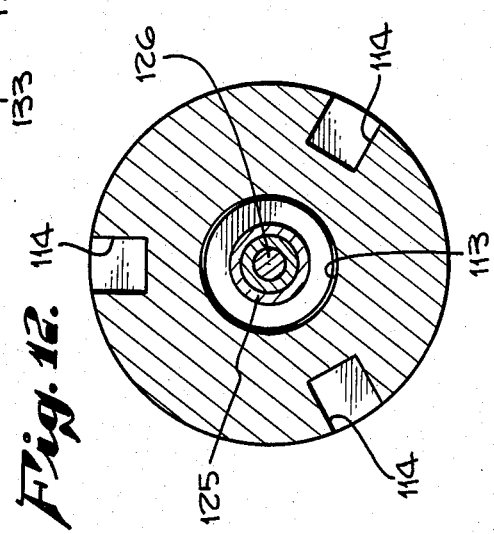

CHUCKING ACCESSORY

In spite of almost the universal employment of the conventional three-jaw chuck for holding a workpiece in a lathe, for example, there continues to be a problem when it becomes necessary to grip the workpiece on an interior wall. Interior gripping of this kind is especially prevalent when the workpiece is in the form of a relatively thin-walled tube. Difficulty continues to be experienced also where interior gripping may be applied to lugs or projections of one kind or another on the workpiece.

On some occasions it may be possible for the mechanic making use of three-jaw chucks of certain designs to project the conventional three-jaw chuck into the workpiece and expand it for gripping the workpiece rather than contracting it. Employment of the conventional three-jaw chuck in this fashion may on occasions be entirely acceptable, but on other occasions may be particularly inadequate. At times the grip may slip and the workpiece be damaged. On other ocassions, especially when thin-walled tubing is encountered, the workpiece may be forced out of round when gripped.

Where circumstances have warranted, some use has been made of a mandrel projected into the interior of the workpiece and the workpiece then gripped on the exterior. On still other occasions interiorly expanding mandrels have been undertaken. In spite of these and other innovations, the machine tool industry still lacks an effective accessory which makes it possible to convert a conventional three-jaw chuck into an expanding interior jaw mandrel or chucking device.

It is therefore among the objects of the invention to provide a new and improved chuck accessory which makes it readily possible to convert the conventional squeezing action of a three-jaw chuck; first into longitudinal movement, and then into a laterally expanding movement for firmly and dependably gripping a workpiece on the interior surface. Another object of the invention is to provide a new and improved chuck accessory capable of being used in a conventional three-jaw chuck which is sufficiently versatile in its design to be accommodated to workpieces, the interior walls of which may vary appreciably in diameter.

Still another object of the invention is to provide a new and improved chuck accessory for operation with a conventional three-jaw chuck which may be firmly, but releasably, attached to the conventional chuck in a positive, dependable fashion in an arrangement such that the full compressive effect of the three-jaw chuck may be translated to expansion of jaws of a split jaw mandrel capable of accepting any one of a number of different designs to accommodate different kinds of workpieces.

Still further included among the objects of the invention is to provide a new and improved chuck accessory for use with a conventional three-jaw chuck of a design such as to be capable of being fitted to the jaws of chucks of varying sizes and design, and which itself is capable of accepting an expandable split jaw mandrel of any one of a number of different sizes and configurations.

Still further included among the objects of the invention is to provide a new and improved chuck accessory for use with a conventional three-jaw chuck in a manner enabling use of the jaw action to be translated into an expanding grip, and which incorporates a fail-safe feature of a character capable of preventing damage to the accessory irrespective of the amount of force which may be applied by the three-jaw action.

With these and other objects in view, the invention consists of the construction, arrangements, and combination of the various parts of the device serving as an example only of one or more embodiments of the invention, whereby the objects contemplated are attained, as hereinafter disclosed in the specification and drawings, and pointed out in the appended claims.

In the drawings:

FIG. 1 is a side elevational view of the chuck accessory broken away to show the interior structure, and mounted in operating position before engagement with a workpiece.

FIG. 2 is an aft end elevational view on the line 2—2 of FIG. 1.

FIG. 3 is a fore end elevational view on the line 3—3 of FIG. 1.

FIG. 4 is a cross-sectional view on the line 4—4 of FIG. 1.

FIG. 5 is a fragmentary longitudinal sectional view of the device of FIG. 1 in the position of parts when gripping is taking place.

FIG. 5a is a side elevational view of a tool for use with the chuck accessory.

FIG. 6 is a fragmentary cross-sectional view on the line 6—6 of FIG. 5.

FIG. 7 is a longitudinal sectional view of another form of the device.

FIG. 8 is a fragmentary cross-sectional view on the line 8—8 of FIG. 7.

FIG. 9 is a side perspective view of a cam ring used in the form of invention of FIG. 7.

FIG. 10 is a longitudinal sectional view of a third form of the device.

FIG. 11 is a cross-sectional view on the line 11—11 of FIG. 10.

FIG. 12 is a cross-sectional view on the line 12—12 of FIG. 10.

In an embodiment of the invention chosen for the purpose of illustration, there are shown jaws 10, 10' of a conventional three-jaw chuck in which the chuck accessory 12 has been located in a general position for engagement with a workpiece 13. In FIG. 1 the workpiece has not yet been engaged by the chuck accessory.

More particularly, the chuck accessory consists of a body 14 on which is a permanently mounted flange 15. Within the body is a draw sleeve assembly 16 capable of being moved endwise within the body by action of a set of bell crank levers 17. Attached to the fore end 18 of the draw sleeve assembly 16 is an expansion plug 19 adapted to cooperate expansively with a split expansion collet 20 in order to engage the workpiece 13.

To accommodate the draw sleeve assembly 16 in the body 14, there is provided a bore 21 adjacent an aft end 22 of the body, the bore 21 having an enlarged portion 23 at an inward location to accommodate a coil spring 24. A reduced diameter protruding aft projection 25 of the draw sleeve assembly 16 has mounted on it a finger follower 26. The follower is a composite assembly incorporating four dished washers 27 and a flat washer 28. The flat washer 28 in company with a retainer 31 holds the follower assembly 26 together and is fastened to the end 29 of the reduced aft projection 25 by a socket head cap screw 30.

For moving the draw sleeve assembly in a direction from left to right as viewed in FIG. 1, the bell crank levers 17, acting as impellers, are pivotally mounted on pins 33 so that when a finger 34 at one end is depressed, a finger 35 at the opposite end is moved in a generally axially aft direction against the retainer 31 which, acting through the dished washers 29 and flat washer 28, urges the follower and the draw sleeve assembly in the left to right direction.

For mounting the bell crank levers 17 in the manner shown, slots 36 are formed at circumferentially spaced locations inwardly from an exterior wall 37 of the body 14, aft portions of the slots being exposed at the aft end 22. To prevent rotation of the draw sleeve assembly, a dowel 38 extends part way into an extension 36' of the slot 36, as shown in FIG. 1.

In the fore end 18 of the draw sleeve assembly, there is provided an axially disposed threaded hole 39 in which a threaded extension 40 of the expansion plug 19 is inserted where it can be tightened in position by use of a hexagonal wrench slot 41.

The split expansion collet 20, serving as a mandrel, has a projection 43 with a frusto-conical tapered exterior 44 adapted to engage in a complementary frusto-conical recess 45 in the body 14. Good practice suggests that it is preferable to have the taper spread of the frusto-conical recess and corresponding projection not less than about ten degrees in order to prevent the engagement from binding too tightly. The engagement just described aligns the collet coaxially with the body 14 and ultimately the jaws 10, 10' of the three-jaw chuck.

In the embodiment of FIG. 1, and as shown in FIG. 3, the collet 20 is split to form four jaws 46, 47, 48 and 49 by respective slits 50, 51, 52 and 53. The slits 50, 51, 52 and 53 are confined to the larger left end portion of the collet, as viewed in FIG. 1.

In the collet an axial bore 54 slideably accommodates the expansion plug 19. At the left, or fore end of the axial bore is a tapered expansion recess 55 within which fits a tapered head 56 of the expansion plug 19. Inwardly of the axial bore 54 is an enlarged portion 57 which freely accommodates the fore end 18 of the draw sleeve assembly 16.

The spring 24, previously described, bottoms on an annular surface 58 at the aft end and engages a retention ring 59 at the fore end, the retention ring being fixed on the draw sleeve assembly. The spring 24 is compressed when the draw sleeve assembly and expansion plug 19 is drawn to expanding position for the collet. The energy stored in the spring 24 when released serves to shift the expansion plug in a direction from right to left, as viewed in FIG. 1, in order to release the jaws 46, 47, 48 and 49 from engagement with the workpiece 13.

Since action of the expansion plug 19 is one tending to snugly engage the projection 43 within the frusto-conical recess 45, means is provided for separating those parts when the collet 20 is to be removed. For this there is provided 4 radially extending holes 60 in the projection 43, located closer to a fore end 61 of the body 14 than an aft surface 62 of the collet. For making the separation, there is provided a wrench 65 having a cylindrical body portion 66 with an eccentrically disposed hexagonal peg 67 at one end and a hexagonal handle 68 at the other. When the collett 20 is to be separated from the body 14, the peg 67 is inserted in the hole 60 and the body portion 66 rotated by use of the handle 68. Due to the eccentric disposition of the peg 67, the wrench is cammed against the fore end 61 and the collett forced loose. The hexagonal peg 67 and handle 68 are both made of tool-quality steel facilitating their use as Allen wrenches. The peg 67 is used to work the retention screw 73 and the handle 68 is used to work the hexagonal wrench slot 41.

For fastening the chuck accessory 12 in position on the jaws 10, 10' of the conventional three-jaw chuck, there are provided three radially extending and circumferentially separated shouldered slots 70, 71 and 72 in the flange 15 of the chuck accessory 12. For each of the shouldered slots 70, 71 and 72 there is provided a screw 73 having a threaded end 74 adapted to be received in an appropriately tapped hole 75 of one of the jaws of the conventional three-jaw chuck. An adjustable collar 76 rides on the shouldered portion of the respective slot 70, 71 and 72. Rings 77 and 78 retain between them spring washers 79. Since, during operation of the movable jaws of the three-jaw chuck, the flange 15 of the chuck accessory must remain fixed, movement of the jaws 10, 10' slides the screws 73 inwardly of the respective shouldered slots 70, 71 and 72 when the chucking action is taking place. Upon release, the screws are adapted to be moved outwardly of the same shouldered slots a distance corresponding to the movement of the jaws of the three-jaw chuck. By employment of the screws 73, the entire chuck accessory 12 can be releasably retained in its operative position on the conventional three-jaw chuck for as long as that may be necessary.

Because of the powerful contracting thrust possible in the three-jaw chuck as the jaws press upon the fingers 34 of the bell crank levers when a workpiece 13 is to be held in position by expansion of the collet 20, provision is made to preclude damage to the chuck accessory. The damage inhibiting provision resides in action of the dished washers 29 heretofore described. The dished effect, coupled with effective choice of material, is sufficient to accommodate radial movement of the fingers 34 from their outermost positions to positions flush with the exterior wall 37 of the body 14. These dished washers 29 are sufficiently rigid so that there is an acceptable ripping effect for the jaws 47, 48 and 49 of the collet when gripping the workpiece, but should there be an objectionable resistance or obstruction during the action as the jaws 10, 10' are clamped into full engagement, the dished washers 29 will absorb the movement and prevent damage to the bell crank levers 17 or their pivot mounting on the pins 33.

Since these bell crank levers are depended upon to absorb a considerable force, the bell crank effect is modified by providing a substantial amount of material at locations inwardly of the pins 33 sufficient that the line of action between each respective finger 34 and the finger 35 at the opposite end passes entirely through the metal of the bell crank lever.

In an embodiment of the invention shown in FIGS. 8, 9 and 10, jaws 10, 10' of a conventional three-jaw chuck are shown ready for engagement with a chuck accessory, indicated generally by the reference character 85, in preparation for engagement with a workpiece 86 by action of a collet 87. In this form a body 88 of the chuck accessory 85 has a series of three circumferentially spaced radially extending apertures 89, 90 and 91. For each radially extending aperture there is a pin 92, an outer end 93 of which projects beyond the exterior wall 94 of the body 88. For each pin there is an oblique face 95 serving as a cam, the cam being adapted to engage an annular cam track 96 on a drive ring 97.

The drive ring 97 is adapted to move against a coil spring 98 which bottoms against an annular face 99 of a flange 100 of a draw sleeve assembly 101. A retainer ring 102 on the draw sleeve assembly 101 holds the drive ring 97 in place. A snap ring 103 prevents inadvertent dislodgment of the draw sleeve assembly 101 from its position within a bore 104 of the draw sleeve assembly. Upon movement inwardly of the chuck jaws 10, 10′, the three pins 92 are driven simultaneously radially inwardly, by which action through the oblique faces 95 and drive ring 97 the spring 98 is compressed against the draw sleeve assembly 101, movement of which pulls upon a draw plug 105 to expand jaws 106 of the collet 87. Where occasions may require it, as suggested by FIG. 7, the jaws may be stepped in order to accommodate a stepped bore 107 of the workpiece 86. Here also a tapered projection 108 on the collet 87 is adapted to be received in a tapered recess 109 of the body 88.

In still another form of the invention shown in FIGS. 10, 11 and 12, a different release is proposed for an expansion collet 115. In this form of device the jaws 10, 10′ of a conventional three-jaw chuck act in the same manner as previously described upon impellers 116, substantially in the form of bell crank levers, mounted upon a body 117 of a chuck accessory 118. In this construction the impellers 116, each pivoting upon a pin 119, when the jaws 10, 10′ compress against fingers 120 to tilt the fingers 121 against the forwardly projecting face 122 of a follower 123. The follower in turn has a threaded engagement with a threaded end 124 of a draw sleeve 125. The draw sleeve 125 acting through an expansion plug 126 spreads respective jaws 127 of the expansion collet 115 in order to engage an interior surface 128 of a workpiece 129. Here again, a tapered projection 130 centers within a tapered recess 131 of the body 117.

During initial clamping movement, the draw sleeve 125 is moved in a direction from left to right, as viewed in FIG. 10, the effect of which is to move the follower 123 against the action of springs 130. Each spring 130 bottoms against a head 131 of a bolt 132. When the jaws 10, 10′ are withdrawn, releasing engagement with the impellers 116, so that they return to the solid line position of FIG. 10, the springs 130 push against the follower 123. The result of this is to shift the draw sleeve 125 in a direction from right to left, as viewed in FIG. 10, sufficient to dislodge the expansion plug 126 and permit contraction of the jaws 127 of the expansion collet 115, thereby releasing the workpiece 129. On this occasion further a flange 133 on the collet 115 may be employed to position the workpiece 29 on the collet. A flange 134 may be provided with attachment screws (not shown) like the screws 73, for mounting the chuck accessory 118 upon the jaws 10, 10′. Here also a collet like the collet 115 can be removed from the body 117 by release of the expansion plug 126 in order to be replaced by a collet of different size, and without removal of the body 117 from the conventional three-jaw chuck.

While particular embodiments of the present invention have been shown and described, it will be obvious to those skilled in the art that changes and modifications may be made without departing from the invention in its broader aspects, and therefore, the aim of its appended claims is to cover all such changes and modifications as fall within the true spirit and scope of this invention.

Having described the invention, what is claimed as new in support of Letters Patent is as follows:

1. In a chuck accessory for grasping a workpiece which has inwardly facing portions by action originating in the jaw assembly of a substantially conventional chucking means, said chuck accessory comprising a body having a substantially cylindrical portion adapted to be located within said jaw assembly and having a centrally disposed axial bore extending between opposite ends of said body, a fore end, an aft end and an exterior wall, a centrally disposed axially extending draw member mounted in axially slidable relationship with said axial bore, an impeller for said draw member, said impeller having a working end in engagement with said draw member and a laterally exposed actuating end, said impeller being movably mounted on said body between a first position wherein said draw member is in a retracted condition and a second position wherein said draw member is in an extended condition, said impeller when in said second position being adapted to shift said draw member in a direction rearwardly relative to said body, a collet having a first axial guide and a complementary axial guide on said body receptive of said first axial guide, a plurality of jaws on said collet having adjacent expandable ends in circumferentially spaced relationship relative to each other and an expansion plug extending between the adjacent ends of said jaws and said draw member and adapted to effect expansion of said expandable ends in response to a shift in position of said impeller whereby to expand said expandable ends into engagement with the inwardly facing portions of the workpiece.

2. A chuck accessory as in claim 1 wherein said draw member comprises a sleeve and a follower on said sleeve at a location overlying the aft end of said body, the working end of said impeller being in operative engagement with said follower.

3. A chuck accessory as in claim 2 wherein said impeller comprises a plurality of lever members having a pivotal mounting at circumferentially spaced locations about said body, one finger of each of said lever members being adapted to extend radially outwardly of the body to a location for engagement by contraction of said conventional chucking means, an opposite finger of each of said lever members having a location for engagement with said follower.

4. A chuck accessory as in claim 3 wherein each said lever member comprises a mass of material on one side of said pivotal mounting located on a line of pressure from said one finger to the opposite finger.

5. A chuck accessory as in claim 1 wherein said impeller comprises a plurality of cam pegs at circumferentially spaced locations in said body, means forming slideways in said body wherein said cam pegs have radially slidable engagement, a follower in engagement with said draw member and a cam on each peg having a camming engagement with said follower.

6. A chuck accessory as in claim 1 wherein said first axial guide on the collet comprises a frusto-conical axial projection and said complementary axial guide on the body comprises a frusto-conical recess.

7. A chuck accessory as in claim 6 wherein the angular distance between diametrically opposite sides of said frusto-conical projection is in excess of 10°.

8. A chuck accessory as in claim 6 wherein said collet is removable from said body for replacement with a collet of different expandable jaw size.

9. A chuck accessory as in claim 6 wherein said collet has an axially facing area adjacent the fore end of said body and separating means adapted for insertion between said body and said collet whereby to disengage said collet from said body.

10. A chuck accessory as in claim 6 wherein said collet has an axial bore for reception of an end portion of said draw member, said draw plug having a threaded engagement with said draw member.

11. A chuck accessory as in claim 1 wherein there is an annular flange at the fore end of said body and sets of retention means at circumferentially spaced locations on said flange for retention of said body on the conventional chucking means.

12. A chuck accessory as in claim 11 wherein each said retention means comprises a radially extending slot in said flange and a retention screw assembly in the slot for operative engagement respectively with said flange and said conventional chucking means.

13. A chuck accessory for grasping a workpiece which has inwardly facing portions by action originating in the jaw assembly of a substantially conventional chucking means, said chuck accessory comprising a body having an axial bore therethrough, a fore end, an aft end and an exterior wall, a draw member slidably mounted in said axial bore, an impeller for said draw member, said impeller having a working end in engagement with said draw member and a laterally exposed actuating end, said impeller being movably mounted on said body between a first position wherein said draw member is in a retracted condition and a second position wherein said draw member is in an extended condition, said impeller when in said second position being adapted to shift said draw member in a direction rearwardly relative to said body, a collet having a first axial guide and a complementary axial guide on said body receptive of said first axial guide, a plurality of expandable jaws on said collet and an expansion plug extending between said expandable jaws and said draw member and adapted to effect expansion of said expandable jaws in response to a shift in position of said impeller whereby to expand said expandable jaws into engagement with the inwardly facing portions of the workpiece, said draw member comprising a sleeve and a follower on said sleeve at a location overlying the aft end of said body, the working end of said impeller being in operative engagement with said follower, comprising a first element in driven engagement with said impeller, a second element in engagement with said sleeve and pressure absorbing means between said elements having a yield point less than the breaking point of said impeller.

14. A chuck accessory for grasping a workpiece which has inwardly facing portions by action originating in the jaw assembly of a substantially conventional chucking means, said chuck accessory comprising a body having an axial bore therethrough, a fore end, an aft end and an exterior wall, a draw member slidably mounted in said axial bore, an impeller for said draw member, said impeller having a working end in engagement with said draw member and a laterally exposed actuating end, said impeller being movably mounted on said body between a first position wherein said draw member is in a retracted condition and a second position wherein said draw member is in an extended condition, said impeller when in said second position being adapted to shift said draw member in a direction rearwardly relative to said body, a collet having a first axial guide and a complementary axial guide on said body receptive of said first axial guide, a plurality of expandable jaws on said collet and an expansion plug extending between said expandable jaws and said draw member and adapted to effect expansion of said expandable jaws in response to a shift in position of said impeller whereby to expand said expandable jaws into engagement with the inwardly facing portions of the workpiece, said draw member comprising a sleeve and a follower on said sleeve at a location overlying the aft end of said body, the working end of said impeller being in operative engagement with said follower, said follower comprising an element in engagement with said impeller and pressure absorbing means comprising circumferentially spaced posts on the rear face of said body and resilient means between each said post and said follower.

15. A chuck accessory for grasping a workpiece which has inwardly facing portions by action originating in the jaw assembly of a substantially conventional chucking means, said chuck accessory comprising a body having an axial bore therethrough, a fore end, an aft end and an exterior wall, a draw member slidably mounted in said axial bore, an impeller for said draw member, said impeller having a working end in engagement with said draw member and a laterally exposed actuating end, said impeller being movably mounted on said body between a first position wherein said draw member is in a retracted condition and a second position wherein said draw member is in an extended condition, said impeller when in said second position being adapted to shift said draw member in a direction rearwardly relative to said body, a collet having a first axial guide and a complementary axial guide on said body receptive of said first axial guide, a plurality of expandable jaws on said collet and an expansion plug extending between said expandable jaws and said draw member and adapted to effect expansion of said expandable jaws in response to a shift in position of said impeller whereby to expand said expandable jaws into engagement with the inwardly facing portions of the workpiece, pressure absorbing means between said impeller and said draw member, said pressure absorbing means comprising a collar on said draw member, a follower in engagement with said impeller and at a location extending around said draw member and spring means between said follower and said collar.

16. A chuck accessory for grasping a workpiece which has inwardly facing portions by action originating in the jaw assembly of a substantially conventional chucking means, said chuck accessory comprising a body having an axial bore therethrough, a fore end, an aft end and an exterior wall, a draw member slidably mounted in said axial bore, an impeller for said draw member, said impeller having a working end in engagement with said draw member and a laterally exposed actuating end, said impeller being movably mounted on said body between a first position wherein said draw member is in a retracted condition and a second position wherein said draw member is in an extended condition, said impeller when in said second position being adapted to shift said draw member in a direction rearwardly relative to said body, a collet having a first axial guide and a complementary axial guide on said body receptive of said first axial guide, a plurality of expandable jaws on said collet and an expansion plug extending between said expandable jaws and said draw member and adapted to effect expansion of said expandable jaws in response to a shift in position of said impeller whereby to expand said expandable jaws into engagement with the inwardly facing portions of the workpiece, an annular flange at the fore end of said body and sets of retention means at circumferentially spaced locations on said flange for retention of said body on the conventional chucking means, each said retention means comprising a radially extending slot in said flange and a retention screw assembly in the slot for operative engagement respectively with said flange and said conventional chucking means, said retention screw assembly comprising a threaded shank, a pair of axially spaced collars and resilient elements between said collars.

* * * * *